United States Patent
Borg et al.

(10) Patent No.: US 9,756,352 B2
(45) Date of Patent: Sep. 5, 2017

(54) VIDEO DECODING APPARATUS AND METHOD

(75) Inventors: Pontus Borg, Lund (SE); Dominic H Symes, Cambridge (GB)

(73) Assignee: ARM Limited, Cambridge (GB)

( * ) Notice: Subject to any disclaimer, the term of this patent is extended or adjusted under 35 U.S.C. 154(b) by 960 days.

(21) Appl. No.: 13/067,913

(22) Filed: Jul. 6, 2011

(65) Prior Publication Data
US 2012/0039393 A1 Feb. 16, 2012

(30) Foreign Application Priority Data

Aug. 13, 2010 (GB) .................................. 1013625.7

(51) Int. Cl.
*H04N 7/26* (2006.01)
*H04N 19/44* (2014.01)
(Continued)

(52) U.S. Cl.
CPC ........... *H04N 19/44* (2014.11); *H04N 19/129* (2014.11); *H04N 19/70* (2014.11)

(58) Field of Classification Search
CPC ....... H04N 19/00115; H04N 19/00884; H04N 19/00533; H04N 19/70; H04N 19/44; H04N 19/129
(Continued)

(56) References Cited

U.S. PATENT DOCUMENTS 6,263,019 B1 * 7/2001 Ryan .......................... 375/240.02
6,917,310 B2 * 7/2005 Pearson et al. .................. 341/50
(Continued)

FOREIGN PATENT DOCUMENTS

CN 1119757 C 8/2003
EP 1 365 592 11/2003
(Continued)

OTHER PUBLICATIONS

Search Report for UK 1013625.7, dated Nov. 18, 2010.
(Continued)

*Primary Examiner* — Zhihan Zhou
(74) *Attorney, Agent, or Firm* — Nixon & Vanderhye P.C.

(57) ABSTRACT

A video decoding apparatus for decoding an encoded video bitstream having frames of video data encoded in rows of macroblocks. The video decoding apparatus comprises a parsing unit configured to receive the encoded video bitstream and to interpret the encoded video bitstream to generate items of macroblock information to be used for reconstructing the video frames of video data. The parsing unit is configured to store the items of macroblock information in a memory in bitstream order. The video decoding apparatus further comprises a line control unit configured to generate line control information associated with each row of macroblocks, the line control information comprising a sequence of pointers to the items of macroblock information stored in the memory, such that sequentially reading the sequence of pointers accesses the items of macroblock information in raster scan order. The line control information is stored in said memory in association with said items of macroblock information. A reconstruction pipeline is configured to reconstruct the frames of video data with reference to the line control information.

23 Claims, 7 Drawing Sheets

(51) Int. Cl.
*H04N 19/70* (2014.01)
*H04N 19/129* (2014.01)

(58) Field of Classification Search
USPC .................. 375/240.12, 240.16, 240.24
See application file for complete search history.

(56) References Cited

U.S. PATENT DOCUMENTS

| | | | |
|---|---|---|---|
| 7,068,717 B2* | 6/2006 | Van Der Schaar | 375/240.02 |
| 7,146,053 B1* | 12/2006 | Rijavec et al. | 382/233 |
| 7,305,036 B2* | 12/2007 | MacInnis et al. | 375/240.25 |
| 7,813,431 B2* | 10/2010 | MacInnis | 375/240.24 |
| 8,494,059 B1* | 7/2013 | Guan et al. | 375/240.23 |
| 2003/0152148 A1* | 8/2003 | Laksono | 375/240.24 |
| 2004/0066852 A1 | 4/2004 | MacInnis | |
| 2006/0222080 A1* | 10/2006 | Wang | 375/240.24 |
| 2008/0159408 A1* | 7/2008 | Degtyarenko | 375/240.25 |
| 2009/0003447 A1* | 1/2009 | Christoffersen et al. | 375/240.16 |
| 2009/0003449 A1* | 1/2009 | Sekiguchi et al. | 375/240.16 |
| 2009/0103635 A1* | 4/2009 | Pahalawatta | 375/240.27 |
| 2010/0046637 A1* | 2/2010 | Raveendran | 375/240.26 |
| 2010/0177891 A1* | 7/2010 | Keidar et al. | 380/200 |
| 2011/0200115 A1* | 8/2011 | Hayashi et al. | 375/240.24 |

FOREIGN PATENT DOCUMENTS

| | | |
|---|---|---|
| JP | 2006-279574 | 10/2006 |
| JP | 2006-345123 | 12/2006 |
| JP | 2008-67026 | 3/2008 |
| JP | 2010-515302 | 5/2010 |
| WO | WO 02084990 A2 * | 10/2002 |
| WO | WO 2009150808 A1 * | 12/2009 |

OTHER PUBLICATIONS

Japanese Office Action dated Aug. 18, 2014 in JP 2011-176893 and English translation, 7 pages.
Chinese Second Office Action dated Jan. 14, 2016 in CN 201110236681.8 and English translation, 6 pages.
UK Examination Report dated Feb. 25, 2016 in GB 1013625.7, 3 pages.
Chinese Office Action issued Apr. 28, 2015 in CN 201110236681.8 and English translation, 18 pages.

* cited by examiner

DISPLAY (RASTER) ORDER:

VIDEO DECODING APPARATUS AND METHOD

This application claims priority to UK Application No. 1013625.7 filed 13 Aug. 2010, the entire content of which is hereby incorporated by reference.

BACKGROUND OF THE INVENTION

Field of the Invention

The present invention relates to decoding an encoded video bitstream, in particular where the encoded video bitstream represents frames of video data encoded in rows of macroblocks.

Description of the Prior Art

Contemporary video encoding techniques, such as those represented by the H.264 "Advanced Video Coding" standard, provide for highly efficient encoding of video data. As such, the decoding process for decoding an encoded video bitstream will typically comprise several stages, from initially interpreting the bit pattern of the bitstream, through extracting information related to individual macroblocks, to reconstructing an entire frame of video data on the basis of those macroblocks.

In some known video decoders, the video decoding process is split into two phases, a first parsing phase in which the received encoded video bitstream is initially interpreted in order to generate macroblock information, and a second pipelined stage in which the macroblock information is processed and combined to reconstruct individual frames of video data.

Whilst it may be the case that the macroblocks in an encoded video bitstream are represented in that bitstream in the same order as those macroblocks appear in the frames of video data (i.e. in raster scan order), video encoding standards such as H.264 permit a Flexible Macroblock Order (FMO), wherein the order in which the macroblocks are encoded in the encoded video bitstream does not correspond to raster scan order. This may for example occur when a frame of video data is encoded in more than one slice, wherein those slices overlap one another. For example, a checkerboard pattern of slices is possible, wherein alternate macroblocks belong to two separate slices of encoded video data. In other words, a video decoding apparatus receiving such an encoded video bit stream will first receive information related to odd (say) numbered macroblocks for the frame, followed by information related to the even numbered macroblocks of that frame. Such interleaving of macroblock slices has advantages in terms of error resilience, because even if a slice of video data is lost in transmission, a reasonable approximation to the original frame of video data may nonetheless be reconstructed by interpolating to generate the missing data. For this reason, these techniques find application in environments where the transmission medium is known to be lossy, but where the absolute quality of the reconstructed video data is of lesser importance, such as in mobile video conferencing.

However, allowing FMO in the encoded video bitstream presents the video decoding apparatus with an increased level of complexity. In particular, a problem arises when the parsing of the encoded video bitstream occurs most efficiently when it is carried out in bitstream order. This can for example be because each slice of encoded video may make reference to itself in its encoding, for example a given macroblock row in one slice may refer to the previous row in that slice. Hence, for the parser, it is most efficient if the identified items of macroblock information are written to memory in bitstream order, such that as the parsing process continues, the parser may easily make reference to earlier identified macroblocks of the same slice. Furthermore, handling the slice as it is received enables the parser to maintain a consistent context for its entropy decoder, thus avoiding the extra bandwidth and processing associated with context switching between slices.

On the other hand, the reconstruction of the identified macroblocks into the frames of video data taking place in the reconstruction pipeline happens most efficiently when it is carried out in raster scan order. This is because it is the raster scan order that defines where the macroblocks lie in relation to one another in the final frames of video data and sequential access to these macroblocks typically permits the most efficient use of, for example, the frame buffer and the motion cache.

FIG. 1 schematically illustrates a known video decoding apparatus 100 in which a video engine 110 comprising a parser 120 and a reconstruction pipeline 130 receives an encoded video bitstream and decodes it, typically for display. The video engine 110 is coupled to memory 140 which the parser 120 and reconstruction pipeline 130 make use of in performing their parts in the decoding operation. As can be seen in FIG. 1, both the parser 120 and reconstruction pipeline 130 are arranged with feedback paths, wherein some of the information they output is fed back as an input (NB these feedback paths are merely schematic, the use of previously output information as an input typically taking place by means of an access to memory 140). It is in particular these feedback loops which determine that parser 120 operates most efficiently in a bitstream order and reconstruction pipeline 130 operates most efficiently in raster scan order.

One approach to unify this situation is to configure the parser to parse the encoded video bitstream in raster scan order. Although this simplifies the overall control of the video encoder, it has the disadvantage that the parsing cannot start until the bitstream for the entire frame has been received, which increases the latency of the video decoder. Furthermore when interleaved slices are received, the process of switching between different slices on a macroblock by macroblock basis involves the above mentioned context switching in the entropy decoder and consequently increases memory access bandwidth.

Alternatively, it would be possible to allow the parser to operate in bitstream order, and also to perform some of the reconstruction in bitstream order, namely decoding slices into pixels, followed by running the deblocking as a second pass. However, this has the disadvantage that the access to the frame buffer (which is the highest bandwidth access in the process) is no longer sequential and therefore inefficient. Furthermore the motion cache in the reconstruction pipeline is also poorly utilised.

Some background information on the technological issues involved can be found in the Wikipedia article "Arbitrary slice ordering" (retrieved from http://en.wikipedia.org/wiki/Arbitrary_slice_ordering on 26 Mar. 2010). The paper "Macroblock-level decoding and deblocking method and its pipeline implementation in H.264 decoder SOC design" Wang S. et al. (Journal—Zhejiang University Science A 2007, Vol. 8, Number 1, pages 36-41) is concerned with the problems raised by FMO and presents a multi-stage video decoder which allows the later phases to run in raster scan order. However, the approach taken involves searching the input bitstream which can be very costly in the case of an entropy encoded bitstream (e.g. CABAC), and involves switching between slices which is expensive in terms of memory accesses.

Accordingly, it would be desirable to provide a technique which enabled each stage of a video decoder to operate in an efficient configuration, avoiding the above described disadvantages of handling data in an order preferred by another part of the video decoder.

SUMMARY OF THE INVENTION

Viewed from a first aspect, the present invention provides a video decoding apparatus for decoding an encoded video bitstream, said encoded video bitstream representing frames of video data encoded in rows of macroblocks, said video decoding apparatus comprising: a parsing unit configured to receive said encoded video bitstream, said parsing unit comprising an interpretation unit configured to interpret said encoded video bitstream to generate items of macroblock information to be used for reconstructing said frames of video data, said parsing unit configured to store said items of macroblock information in a memory in bitstream order; a line control unit configured to generate line control information associated with each row of macroblocks, said line control information comprising a sequence of pointers to said items of macroblock information stored in said memory, such that sequentially reading said sequence of pointers accesses said items of macroblock information in raster scan order, said line control unit configured to store said line control information in said memory in association with said items of macroblock information; and a reconstruction pipeline configured to reconstruct said frames of video data with reference to said line control information.

According to the techniques of the present invention the parsing unit of the video decoding apparatus receives the encoded video bitstream which contains information relating to the rows of macroblocks in which the frames of video data are encoded. The parsing unit, by means of its interpretation unit, interprets the encoded video bitstream and generates items of macroblock information which are written into a memory in the same order in which they are received in the encoded video bitstream. Hence, the parsing unit operates on macroblocks in bitstream order, handling each macroblock as it arrives, without the need to perform any reordering of the macroblocks.

A line control unit is provided which generates line control information associated with each row of macroblocks. The line control unit generates a sequence of pointers to items of macroblock information stored in the memory, these pointers being arranged in the sequence such that sequentially reading the sequence of pointers accesses items of macroblock information in raster scan order. This line control information is stored in the memory in association with the items of macroblock information, meaning that when those items of macroblock information are accessed, the line control information may also be accessed, in particular allowing access to the items of macroblock information to take place in raster scan order. This is particularly beneficial in the reconstruction pipeline of the video decoding apparatus, which operates most efficiently when reconstructing frames of video data on the basis of macroblock information when doing so in raster scan order of the macroblocks.

Hence, the parsing unit is able to handle the macroblock information in bitstream order, efficiently storing the items of macroblock information in the memory in the same order in which they are received in the encoded video bitstream, without the need to perform any reordering. At the same time, the provision of the line control information in association with the items of macroblock information stored in the memory means that subsequent access to those items of macroblock information, such as by the reconstruction pipeline when reconstructing frames of video data, may take place in raster scan order, thus allowing the reconstruction to operate in an efficient configuration, which reduces the energy consumption of the video decoding apparatus and reduces the memory bandwidth required within the video decoding apparatus.

The techniques of the present invention are of particular benefit when the order in which the macroblocks are encoded in the encoded video bitstream does not correspond to the raster scan order in which those macroblocks appear in the frames of video data since the macroblocks may on the one hand be read directly from the memory in bitstream order (having been written into the memory in bitstream order), but may on the other hand also be retrieved from the memory (by reference to the line control information) in raster scan order. Whilst the techniques of the present invention are also applicable in situations where the bitstream order is the same as the raster scan order (and in which the line control information then simply indicates a sequence of items of macroblock information which are already in raster scan order in the order in which they have been stored in memory), in embodiments of the present invention the bitstream order and the raster scan order are different from one another.

The interpretation of the encoded video bitstream carried out by the interpretation unit of the parsing unit may take a number of forms, in particular in dependence on the particular codec which has been used to encode the video bitstream, but in embodiments of the present invention the interpretation unit comprises a prediction resolver configured to resolve predictive encoding between macroblocks of said encoded video stream. Predictive encoding between macroblocks of the encoded video stream is one technique which allows the video bitstream to be more efficiently encoded, since the information content of one macroblock may be used to predict the information content of another macroblock and thus reduce the amount of information required to encode the latter macroblock. Such predictive encoding may, for example, comprise row prediction, in which the macroblocks of a current row of macroblocks have been encoded with respect to a previous row of macroblocks within the same frame, or may comprise temporal (or "co-located") prediction in which a macroblock in one frame is predicted with respect to a macroblock in the same position in a previous frame.

In some embodiments, said parsing unit is further configured when storing an item of macroblock information in said memory, if said item of macroblock information does not sequentially follow in raster scan order a preceding item of macroblock information in said memory, to store a marker in said memory preceding said item of macroblock information, said marker indicative of a number of macroblocks which intercede said preceding item of macroblock information and said item of macroblock information in raster scan order.

Accordingly, when the parsing unit stores an item of macroblock information in the memory, if that item of macroblock information does not sequentially follow in raster scan order the preceding item of macroblock information stored in the memory, for example because the slice of video data currently being decoded encodes alternate macroblocks in a frame in a checkerboard fashion, the parsing unit is configured to store a marker preceding the item of macroblock information currently being decoded, wherein the marker indicates how many macroblocks have been skipped when viewed in raster scan order. Hence, whilst on the one hand the parsing unit continues to store the items of macroblock information in the memory in the order in which they are received in the encoded video bitstream, i.e. in bitstream order, the additional markers stored in the memory indicate the layout of the items of macroblock information when viewed in raster scan order, i.e. in the original frame of video data. This additional information stored with the items of macroblock information allows them to be read sequentially in the memory, but including the knowledge of how they appear in the frame of video data.

Storing a marker in the memory in this fashion can have a number of advantages, and in one such embodiment said prediction resolver is configured to resolve said predictive encoding between macroblocks of said encoded video stream with reference to a sequence of items of macroblock information stored in said memory including at least one said marker.

The presence of the at least one marker in the sequence of items of macroblock information which the prediction resolver refers to enables the prediction resolver to resolve the predicted encoding by knowing where the macroblocks lie in the frame of video data, but whilst still reading them in sequential order. For example, where the prediction resolver needs to refer to the previous row of macroblocks, the marker enables the prediction resolver to determine the relative location of the read macroblocks from that previous row.

It will be appreciated that the marker could take a number of forms, but in one embodiment the marker has an item of macroblock information data format. Using the same data format for the marker as for the item of macroblock information has advantages for both writing and reading the items of macroblock information, since the same data format will be present whether a marker or a genuine item of macroblock information is being written/read.

When the marker has an item of macroblock information data format, in some embodiments the marker includes a flag indicating that said marker is not an item of macroblock information. This enables a simplified reading process wherein items of macroblock information and markers may be easily distinguished.

It will be recognised that the flag could take a number of forms, but in one embodiment the flag comprises a zero length indication. Items of macroblock information may have differing lengths depending on the complexity of the data encoded therein, but a genuine item of macroblock information will have finite length, and hence using a zero length indication provides a convenient mechanism for implementing the flag showing that the marker is not a true item of macroblock information.

The provision of the line control information enables subsequent processes to access the items of macroblock information in raster scan order, such as those carried out in the reconstruction pipeline, and hence any markers stored in the memory (effectively indicating a difference between bitstream order and raster scan order of the macroblocks) are not required by those subsequent processes. Whilst it would be possible to configure the reconstruction pipeline to ignore such markers, it is advantageous if they are simply not seen in the reconstruction pipeline. Hence in some embodiments said line control unit is configured to generated said sequence of pointers such that said reconstruction pipeline does not encounter said marker when reconstructing said frames of video data with reference to said line control information. In other words following the sequence of pointers does not result in a marker being read.

It will be appreciated that the particular form that the marker takes when stored in the memory may take a variety of forms, but in some embodiments the marker is run length compressed. The marker has a relatively simple task to perform and hence it is advantageous if it only occupies a small amount of memory, and run length compression is an efficient way of achieving this.

It will be appreciated that the line control information can take a number of forms, but in embodiments of the present invention the line control information comprises a vector, said vector having a length given by how many rows of macroblocks are in each frame of video data, each element of said vector indicating said sequence of pointers for a corresponding row of that frame.

Accordingly, one vector can be provided for each frame of video data, the length of the vector being determined by the number of rows of macroblocks in the frame, and each element of the vector then points to the sequence of pointers corresponding to each row. This presents a format in which the line control information may be easily managed, written and read.

In some such embodiments, a first pointer indicated by said vector is stored in a first element of said vector. Whilst the vector may indicate a number of pointers for a given row of the frame, it may be the case that only one pointer is required for a given row, when for that row the items of macroblock information stored in the memory are already in raster scan order (i.e. the bitstream order corresponded to raster scan order). In this situation the reading process for the line control information is simplified if the single pointer required for this row is stored in the vector itself.

In some embodiments said line control unit is further configured to include in said line control information an indication of how many pointers are comprised in said sequence of pointers. Providing an indication of how many pointers are in the sequence facilitates the reading process for that sequence of pointers.

In some embodiments said line control unit is further configured to include in each pointer of said sequence of pointers an indication of how many sequential macroblocks are pointed to by that pointer. An indication of how many sequential macroblocks are pointed to by each pointer enables a later process reading the items of macroblock information from the memory by means of the line control information to simply read the items of macroblock information, without the need for that later process to identify the end of each run of sequential macroblocks, for example by reading until a marker is encountered.

The sequence of pointers indicating the raster scan order of the items of macroblock in memory further provides a mechanism by which errors in the bitstream can be efficiently handled, and in some embodiments said line control unit is further configured, if said parsing unit determines that said encoded video bitstream contains an error corresponding to at least one item of macroblock information, to omit a corresponding pointer to said at least one item of macroblock information from said sequence of pointers. Hence, items of macroblock information that have been corrupted as a result of errors in the encoded video bitstream can simply and efficiently be omitted from a later reading process by means of a corresponding pointer being omitted from the sequence of pointers.

The prediction resolver in the interpretation unit could take a number of forms, but in some embodiments the prediction resolver is configured to resolve temporal predictive encoding with respect to a previously decoded frame of video data, and said prediction resolver is configured to retrieve items of macroblock information corresponding to said previously decoded frame of video data by reference to said line control information. Hence, the line control information provides an efficient mechanism for the prediction resolver to access a previously decoded frame of video data that has already been stored in the memory.

It will be recognised that the prediction resolver could be configured to perform various different types of prediction, and in some embodiments said prediction resolver is configured to perform motion vector prediction. Further, in some embodiments the prediction resolver is configured to perform intra-mode prediction.

The line control information provides for a particularly efficient reading mechanism for the items of macroblock information stored in the memory, and in some embodiments said reconstruction pipeline is configured to perform parallel decoding on said frames of video data and to reference said line control information to read items of macroblock information in parallel from said memory. Parallel decoding performed by the reconstruction pipeline allows a greater throughput of video data through the video decoding apparatus.

Such parallel reading of macroblock information from the memory could take place in a number of ways. In one embodiment said reconstruction pipeline is configured to reference said line control information to read said frames of video data in parallel from said memory. In another embodiment said reconstruction pipeline is configured to reference said line control information to read said rows of macroblock information in parallel from said memory.

Viewed from a second aspect the present invention provides a method of decoding an encoded video bitstream, said encoded video bitstream representing frames of video data encoded in rows of macroblocks, the method comprising the steps of: receiving said encoded video bitstream; interpreting said encoded video bitstream to generate items of macroblock information to be used for reconstructing said frames of video data; storing said items of macroblock information in a memory in the same order in which they are received in said encoded video bitstream; generating line control information associated with each row of macroblocks, said line control information comprising a sequence of pointers to said items of macroblock information stored in said memory, such that sequentially reading said sequence of pointers accesses said items of macroblock information in raster scan order; storing said line control information in said memory in association with said items of macroblock information; and reconstructing said frames of video data with reference to said line control information.

Viewed from a third aspect, the present invention provides a non-transitory computer readable storage medium storing a computer program, which when loaded onto a computing device causes said computing device to carry out the method of the second aspect.

Viewed from a fourth aspect the present invention provides a video decoding apparatus for decoding an encoded video bitstream, said encoded video bitstream representing frames of video data encoded in rows of macroblocks, said video decoding apparatus comprising: a parsing means for receiving said encoded video bitstream, said parsing means comprising an interpretation means for interpreting said encoded video bitstream to generate items of macroblock information to be used for reconstructing said frames of video data, said parsing means for storing said items of macroblock information in a memory in the same order in which they are received in said encoded video bitstream; a line control means for generating line control information associated with each row of macroblocks, said line control information comprising a sequence of pointers to said items of macroblock information stored in said memory, such that sequentially reading said sequence of pointers accesses said items of macroblock information in raster scan order, said line control means for storing said line control information in said memory in association with said items of macroblock information; and a reconstruction pipeline means for reconstructing said frames of video data with reference to said line control information.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
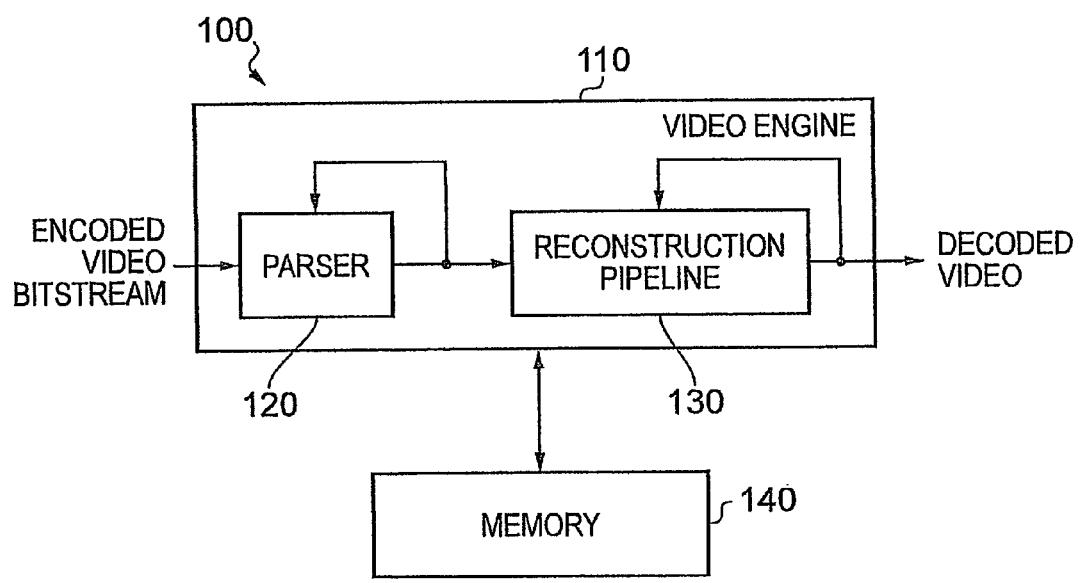
FIG. 1 schematically illustrates a video decoding apparatus according to the prior art.
Figure 2:
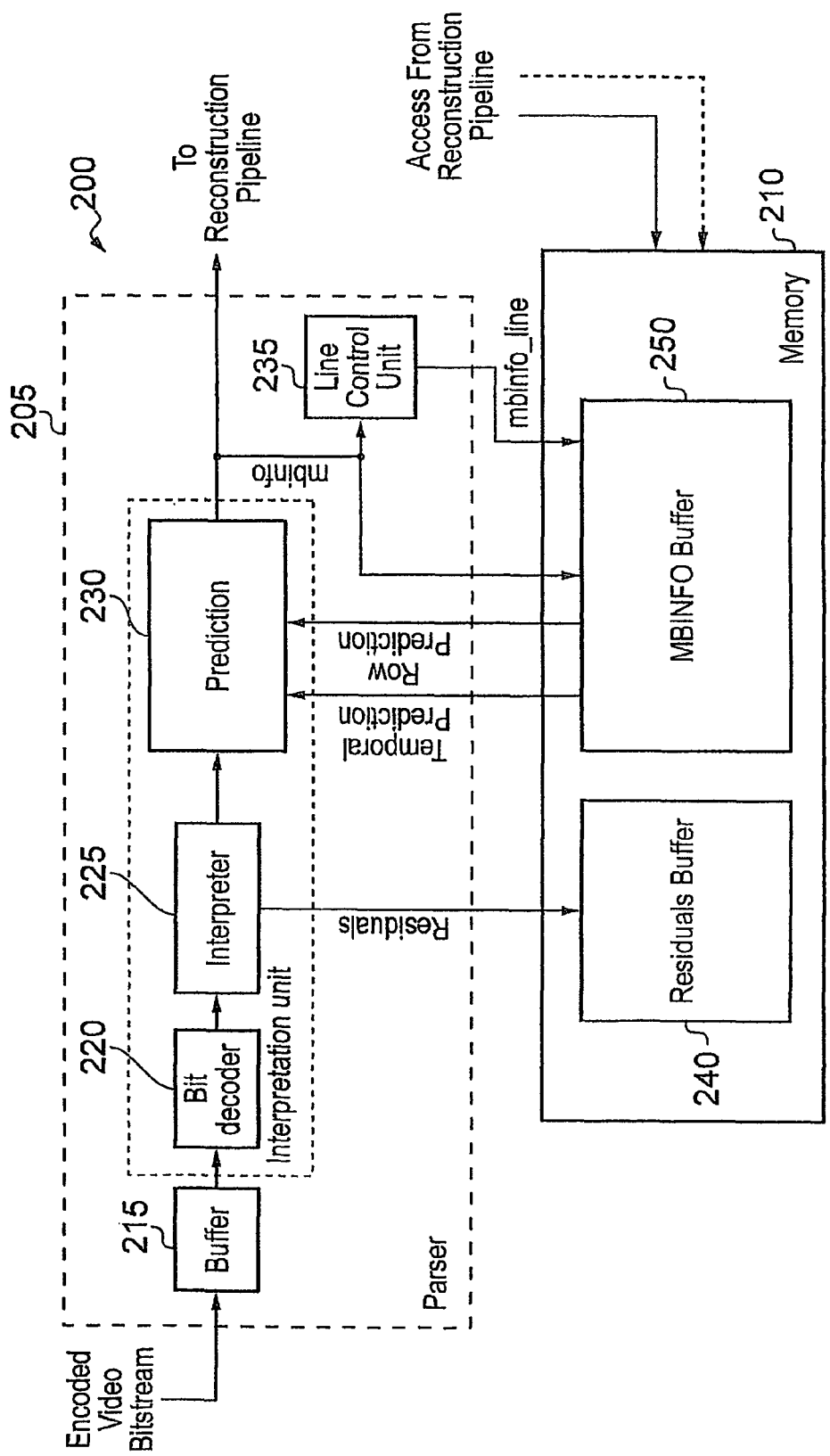
FIG. 2 schematically illustrates some components of a parsing unit and a memory in a video decoding apparatus in one embodiment.

FIG. 2 schematically illustrates various components of a video decoding apparatus 200 according to one embodiment. For simplicity, only the parser 205 and a memory 210 are illustrated. The other main significant component of the video decoding apparatus, namely the reconstruction pipeline, has been omitted for clarity.

The parser 205 receives an encoded video bitstream via buffer 215 which temporarily stores the encoded video bitstream before it is passed to the substantive parts of the parser 205 which perform the interpretation of the encoded video bitstream. These further components are schematically represented by bit decoder 220, interpreter 225 and prediction unit 230. Together bit decoder 220, interpreter 225 and prediction unit 230 can generally be considered to form an interpretation unit.

Bit decoder 220 is configured to perform an initial interpretation of the sequence of bits which forms the bitstream, for example translating received packed sequences of bits into corresponding unpacked versions. The interpreter unit 225 begins the true interpretation process by identifying macroblock information within the bitstream and extracting residual information. The residual information is written by interpreter 225 into the residuals buffer 240 in memory 210. The final stage of interpretation within the parser 205 is carried out by prediction unit 230. Prediction unit 230 generates the items of macroblock information (mbinfo) which it then writes into the mbinfo buffer 250 in memory 210. Part of the prediction carried out by prediction unit 230 comprises temporal prediction, wherein co-located macroblock information from a previously decoded frame is retrieved from mbinfo buffer 250. Another kind of prediction performed by prediction unit 230 is row prediction, wherein items of macroblock information belonging to a previous row of the frame currently being decoded are retrieved and used to predict the content of the current row being decoded.

Parser 205 also comprises line control unit 235. Line control unit 235 monitors the items of macroblock information generated by prediction unit 230 and intermittently generates line control information which it stores in mbinfo buffer 250 in association with the items of macroblock information being written there by prediction unit 230. Importantly, the line control unit 235 generates the line control information comprising a sequence of pointers to the items of macroblock information stored in mbinfo buffer 250 by prediction unit 230, the sequence of pointers being such that when these are read in order the items of macroblock information are accessed in raster scan order. Hence, for example, when the reconstruction pipeline accesses mbinfo buffer 250 in memory 210 it can do this by means of the line control information (mbinfo_line) to then retrieve items of macroblock information in raster scan order. Conversely note that parsing unit 205 writes the items of macroblock information into memory 210 in the order in which it receives them in the bitstream.

The retrieval of items of macroblock information from memory 210 by the reconstruction pipeline can also be parallelised (schematically illustrated by the dashed access line in FIG. 2). Thus, more than one item of line control information (mbinfo_line) can be accessed by the reconstruction pipeline at a time to increase the reconstruction throughput. This may involve accessing multiple lines of macroblock information in parallel, and/or accessing multiple frames in parallel.

Parsing unit 205 is further configured to store a marker between items of macroblock information stored in mbinfo buffer 250 when those two items of macroblock information do not sequentially follow one another in raster scan order. These markers are discussed in more detail with reference to FIG. 3.

Figure 3:
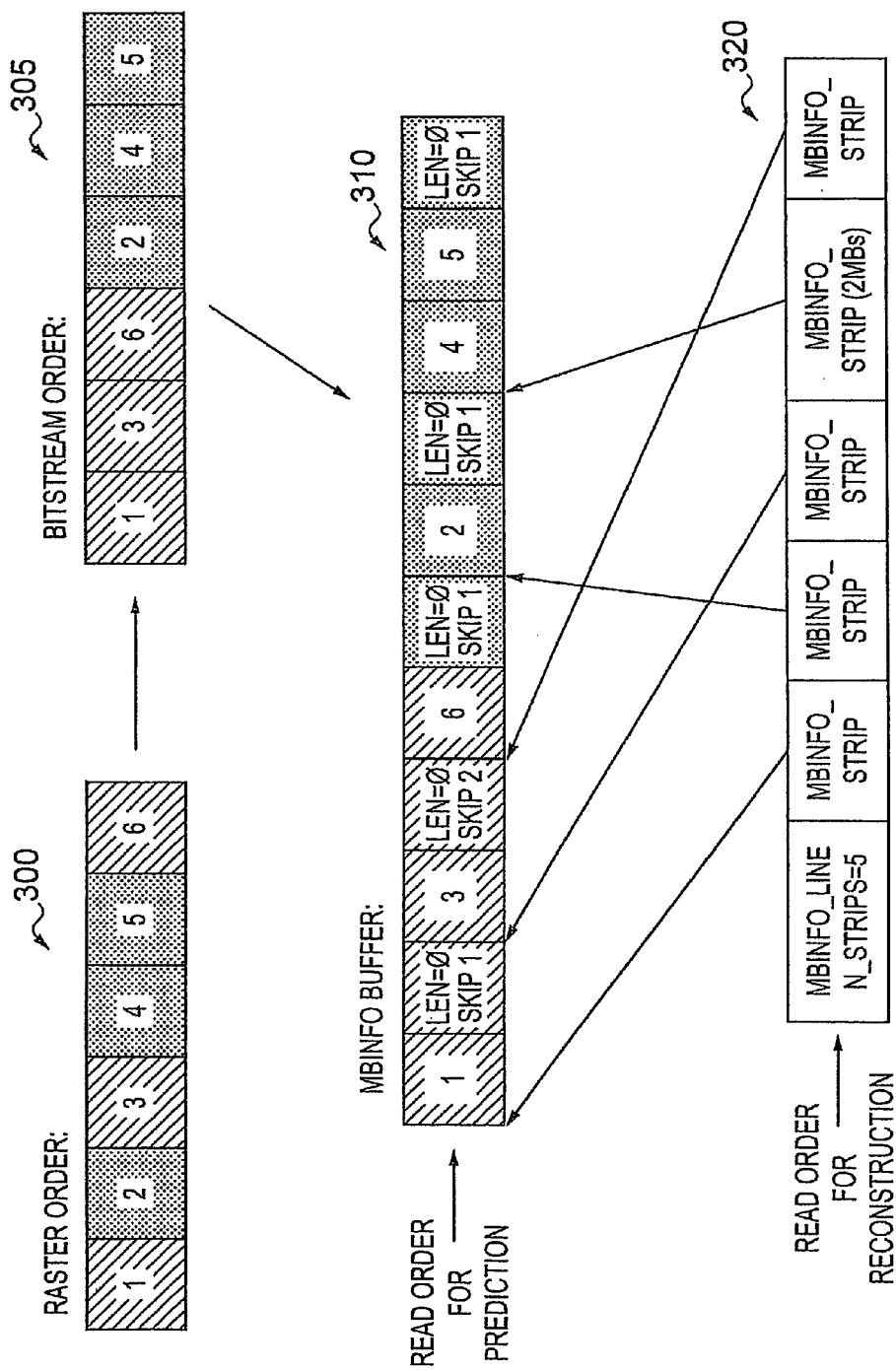
FIG. 3 schematically illustrates macroblock information in raster order, in bitstream order, and how items of macroblock information are stored in memory in one embodiment.

A difference between raster scan order and bitstream order for a sequence of macroblocks is schematically illustrated in FIG. 3. The set of six macroblocks 300 is encoded in two slices (illustrated by the hatched and dotted boxes respectively). This then means that in bitstream order 305 the hatched macroblocks 1, 3 and 6 are received first, followed by the dotted macroblocks 2, 4 and 5. The sequence of macroblocks 310 then illustrates how these items of macroblock information are written into mbinfo buffer 250. Reading from left to right, macroblock 1 is written first, followed by a marker indicating that the next item of macroblock information does not immediately follow in raster scan order. This marker has the same data format as an item of macroblock information but in its header is labelled as having a zero length (len=0) and indicates how many macroblocks have been skipped (when viewed in raster scan order). Similarly, macroblock 3 is followed by a marker indicating that two macroblocks have been skipped. Writing the items of macroblock data into the mbinfo buffer in this manner allows the parsing unit to handle the macroblocks in the bitstream order 305 in which they are received. Furthermore, when prediction unit 230 needs to read these items of macroblock data in order to carry out a prediction operation, the items of macroblock information 310 can simply be read in order.

Line control unit 235 monitors the items of macroblock information being written into mbinfo buffer 250. In particular, when a complete row of macroblocks has been written into mbinfo buffer, the line control unit 235 writes the line control information mbinfo_line into the mbinfo buffer 250 in association with the items of macroblock information corresponding to that line. The line control information mbinfo_line comprises a vector indicating a sequence of pointers (mbinfo_strip) which each point to an item of macroblock information in the mbinfo buffer 250. The mbinfo_strip pointers are arranged such that when this sequence of pointers 320 is read, the items of macroblock information referred to are read in raster scan order.

Figure 4:
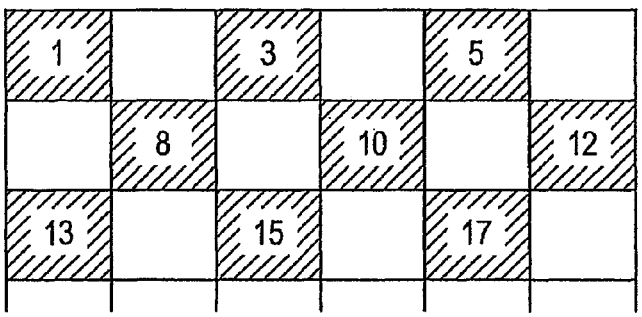
FIG. 4 schematically illustrates a checkerboard pattern of a slice of encoded video data and its corresponding storage pattern in the mbinfo buffer in one embodiment.
Figure 4:
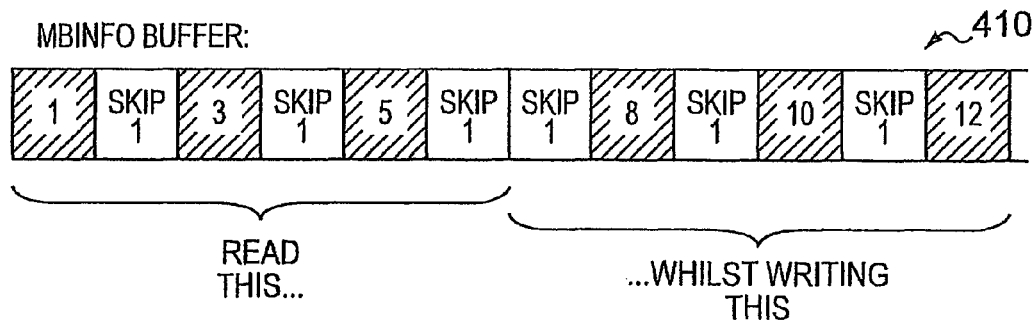

FIG. 4 schematically illustrates a frame of macroblock information 400 in which alternate macroblocks are encoded in a first slice in a checkerboard fashion. A slice encoding like this may be of particular benefit when used in the context of a lossy transmission medium, so that data loss in transmission can be accommodated and a reasonable quality of decoded video (e.g. by interpolation) can still be provided. As described above the items of macroblock information 1, 3 and 5 are written into the mbinfo buffer 250 including intervening markers indicating that a macroblock has been skipped between macroblock 1 and macroblock 3, and between macroblock 3 and macroblock 5. A marker follows macroblock 5 indicating that macroblock 6 is skipped in this slice. The series of items of macroblock information 410 illustrated in FIG. 4 shows how a previously parsed row of macroblock information (1, 3, 5) is read whilst the next row of macroblock information (8, 10, 12) is being parsed and written to the mbinfo buffer. This is part of the row prediction process, for example where macroblock 8 is interpreted with reference to adjacent macroblocks 1 and 3 in the previous row. Note also that between macroblocks 5 and 8 there are two "skip one" indicators (instead of one "skip two" indicator) since this enables each row to be handled individually.

Figure 5:
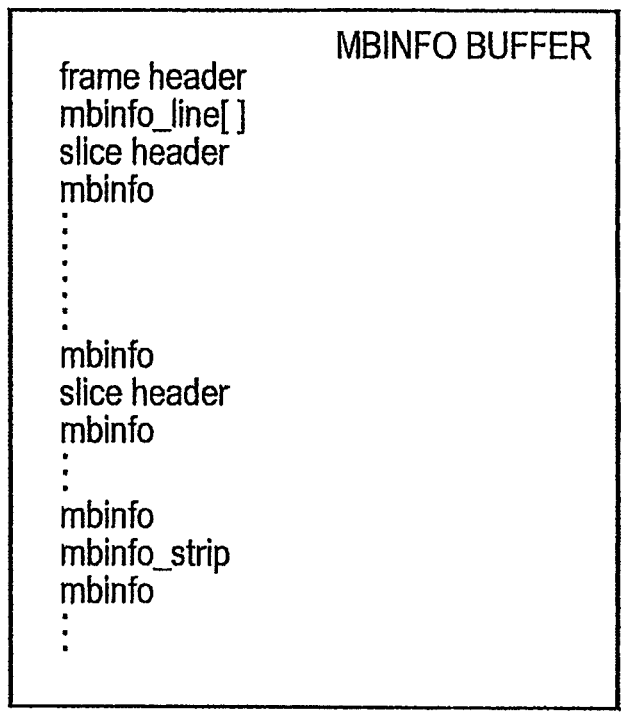
FIG. 5 shows an example content of the mbinfo buffer in memory without flexible macroblock ordering in one embodiment.

FIG. 5 illustrates an example content of the mbinfo buffer stored in the mbinfo buffer in a situation where the encoded video bitstream received does not include flexible macroblock ordering. The content begins with a frame header which contains basic frame information (e.g. frame type, interlace method etc.) and indicates where other information for the frame can be found. Following the frame header in the mbinfo structure is the mbinfo_line vector. This vector has a length corresponding to the number of macroblock lines in the frame and contains information on how to find the strips for a line. This information is in a form of a pointer indicating where the corresponding items of macroblock information are stored. The mbinfo_line vector is followed by a slice header which provides information (e.g. slice ID, number of macroblocks and slice type) for the following slice. The items of macroblock information belonging to that slice then follow. The entire frame is built up in this fashion, with a slice header proceeding a set of items of macroblock information belonging to that slice. In addition, where a slice change occurs within a line an mbinfo_strip item is used.

Figure 6:
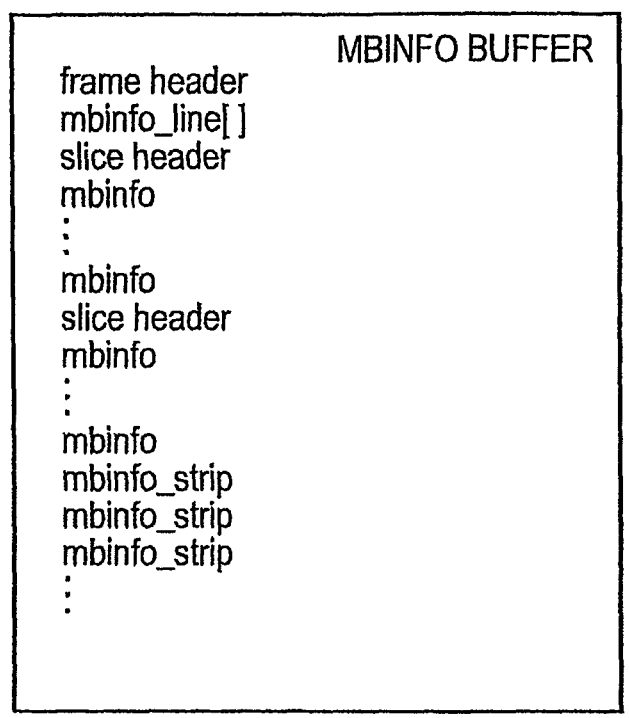
FIG. 6 illustrates an example content of the mbinfo buffer in memory with flexible macroblock ordering in one embodiment.

FIG. 6 illustrates the content of the mbinfo buffer for a frame of macroblock information which does include flexible macroblock ordering. The general structure is similar to that described with reference to FIG. 5, with the exception of the sequence of mbinfo_strip items stored in sequence at the end. These mbinfo_strip items are generated by the line control unit once a full line has been completed and the mbinfo_line vector can be populated with pointers to each of these mbinfo_strip items (as described with reference to FIG. 3).

Figure 7:
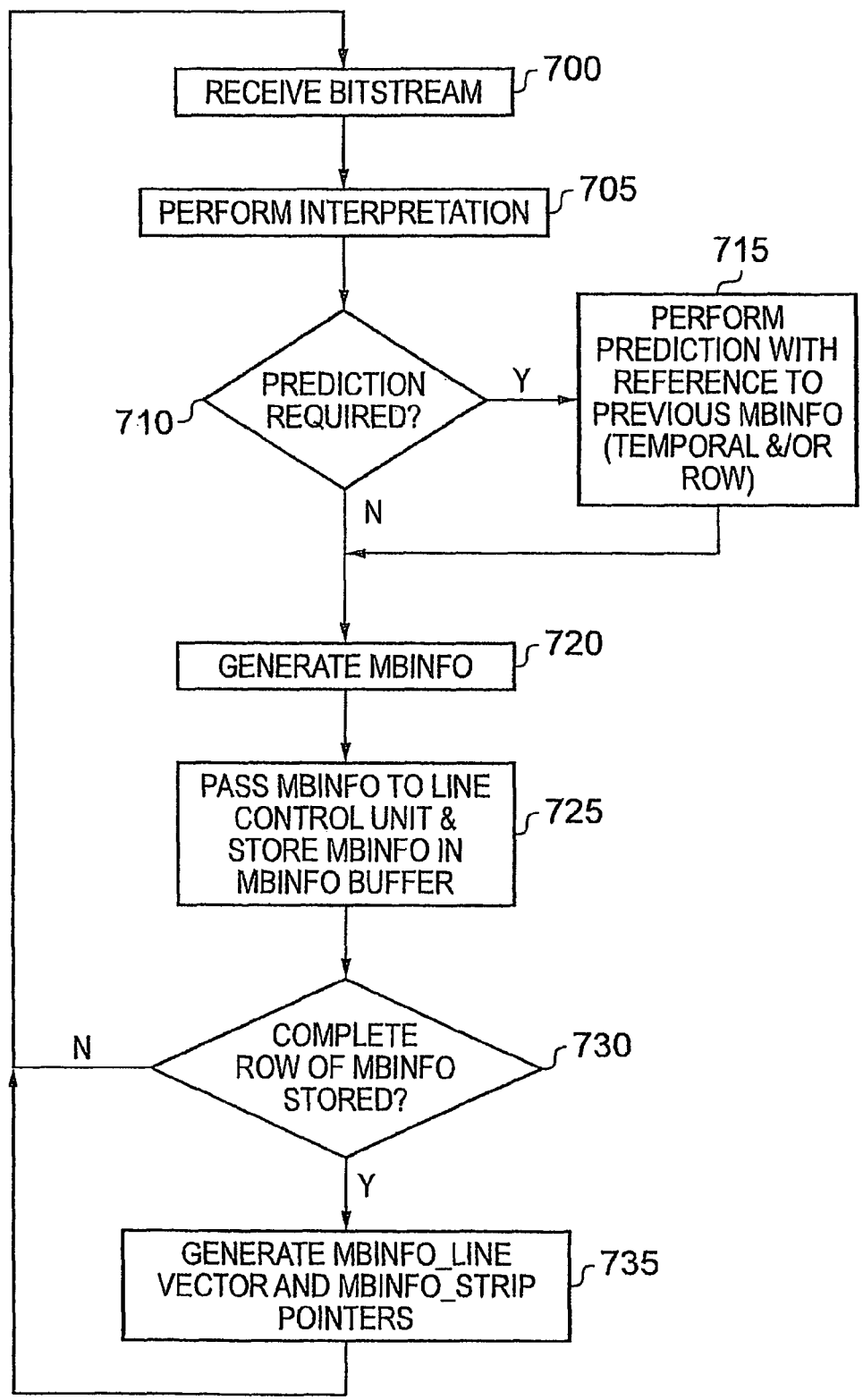
FIG. 7 schematically illustrates a series of steps taken by a parsing unit in one embodiment.

FIG. 7 schematically illustrates a series of steps taken by the parser 205 (illustrated in FIG. 2). The flow begins at step 700 where the parser receives an encoded video bitstream, which is temporarily buffered in buffer 215. At step 705 the first stages of interpretation (i.e. bit decoding and residual extraction) are performed. Then at step 710 it is determined if there is prediction required (by prediction unit 230) in order to generate the items of macroblock information from the received encoded video bitstream. If prediction is required the flow proceeds via step 715 where temporal and/or row prediction is performed with reference to previously stored items of macroblock information retrieved from mbinfo buffer 250 stored in memory 210. The flow then proceeds to step 720 (where the flow also directly proceeds to from step 710 if no prediction is required). At step 720 items of macroblock information (mbinfo) are generated and at step 725 are passed to mbinfo buffer 250 for storage. They are also passed to line control unit 235, which monitors the line-by-line build up of macroblocks. At step 730 it is determined by line control unit 235 if a complete row of macroblock information has now been stored in the mbinfo buffer 250. If it has not then the flow simply returns to step 700. When a complete row of macroblock information has been stored in the mbinfo buffer 250, at step 735 the line control unit 235 generates the mbinfo_line vector and the required mbinfo_strip pointers and stores these in the mbinfo buffer 250. It should be noted that generating the mbinfo_line vector will typically comprise populating the elements of the vector which has been previously created.

Hence, according to the techniques of the present invention, in a video decoding apparatus the parsing unit is able to handle the macroblock information in bitstream order, whilst the reconstruction pipeline can handle the macroblock information in raster scan order. As such, both components are able to operate in their more efficient configuration, reducing the energy consumption of the video decoding apparatus and reduces the memory bandwidth required within the video decoding apparatus.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A video decoding apparatus for decoding an encoded video bitstream, said encoded video bitstream representing frames of video data encoded in rows of macroblocks, said video decoding apparatus comprising:
a parser configured to receive said encoded video bitstream, interpret said encoded video bitstream to perform entropy decoding, generate items of macroblock information to be used for reconstructing said frames of video data, and store said items of macroblock information in a memory in bitstream order;
a line control processor configured to generate line control information associated with each row of macroblocks, said line control information configured such that sequentially reading said line control information provides access to said items of macroblock information in raster scan order, said line control processor configured to store said line control information in said memory in association with said items of macroblock information,
wherein said parser is configured to resolve predictive encoding between macroblocks of said encoded video stream while reading said macroblocks in sequential order; and
a reconstruction pipeline configured to reconstruct said frames of video data with reference to said line control information.

2. The video decoding apparatus as claimed in claim 1, wherein said bitstream order and said raster scan order differ from one another.

3. The video decoding apparatus as claimed in claim 1, wherein said parser is further configured, when storing an item of macroblock information in said memory, if said item of macroblock information does not sequentially follow in raster scan order a preceding item of macroblock information in said memory, to store a marker in said memory preceding said item of macroblock information, said marker indicative of a number of macroblocks which intercede said preceding item of macroblock information and said item of macroblock information in raster scan order.

4. The video decoding apparatus as claimed in claim 1, wherein said parser is configured to resolve said predictive encoding between macroblocks of said encoded video stream with reference to a sequence of items of macroblock information stored in said memory including at least one said marker.

5. The video decoding apparatus as claimed in claim 3, wherein said marker has an item of macroblock information data format.

6. The video decoding apparatus as claimed in claim 5, wherein said marker includes a flag indicating that said marker is not an item of macroblock information.

7. The video decoding apparatus as claimed in claim 6, wherein said flag comprises a zero length indication.

8. The video decoding apparatus as claimed in claim 3, wherein said line control processor is configured to generate said sequence of pointers such that said reconstruction pipeline does not encounter said marker when reconstructing said frames of video data with reference to said line control information.

9. The video decoding apparatus as claimed in claim 3, wherein said marker is run length compressed.

10. The video decoding apparatus as claimed in claim 1, wherein said line control information comprises a vector, said vector having a length given by how many rows of macroblocks are in each frame of video data, each element of said vector indicating said sequence of pointers for a corresponding row of that frame.

11. The video decoding apparatus as claimed in claim 10, wherein a first pointer indicated by said vector is stored in a first element of said vector.

12. The video decoding apparatus as claimed in claim 1, wherein said line control processor is further configured to include in said line control information an indication of how many pointers are comprised in said sequence of pointers.

13. The video decoding apparatus as claimed in claim 1, wherein said line control processor is further configured to include in each pointer of said sequence of pointers an indication of how many sequential macroblocks are pointed to by that pointer.

14. The video decoding apparatus as claimed in claim 1, wherein said line control processor is further configured, if said parser determines that said encoded video bitstream contains an error corresponding to at least one item of macroblock information, to omit a corresponding pointer to said at least one item of macroblock information from said sequence of pointers.

15. The video decoding apparatus as claimed in claim 1, wherein said parser is configured to resolve temporal predictive encoding with respect to a previously decoded frame of video data, and to retrieve items of macroblock information corresponding to said previously decoded frame of video data by reference to said line control information.

16. The video decoding apparatus as claimed in claim 1, wherein said parser is configured to perform motion vector prediction.

17. The video decoding apparatus as claimed in claim 1, wherein said parser is configured to perform intra-mode prediction.

18. The video decoding apparatus as claimed in claim 1, wherein said reconstruction pipeline is configured to perform parallel decoding on said frames of video data and to reference said line control information to read items of macroblock information in parallel from said memory.

19. The video decoding apparatus as claimed in claim 18, wherein said reconstruction pipeline is configured to reference said line control information to read said frames of video data in parallel from said memory.

20. The video decoding apparatus as claimed in claim 18, wherein said reconstruction pipeline is configured to reference said line control information to read said rows of macroblock information in parallel from said memory.

21. A method of decoding an encoded video bitstream, said encoded video bitstream representing frames of video data encoded in rows of macroblocks, the method comprising the steps of:
    receiving said encoded video bitstream;
    interpreting said encoded video bitstream to perform entropy decoding and generate items of macroblock information to be used for reconstructing said frames of video data;
    storing said items of macroblock information in a memory in the same order in which they are received in said encoded video bitstream;
    generating line control information associated with each row of macroblocks, said line control information configured such that sequentially reading said line control information provides access to said items of macroblock information in raster scan order;
    storing said line control information in said memory in association with said items of macroblock information;
    resolving predictive encoding between macroblocks of said encoded video stream while reading said macroblocks in sequential order; and
    reconstructing said frames of video data with reference to said line control information.

22. A non-transitory computer readable storage medium storing a computer program, which when loaded onto a computing device causes said computing device to carry out the method of claim 21.

23. A video decoding apparatus for decoding an encoded video bitstream, said encoded video bitstream representing frames of video data encoded in rows of macroblocks, said video decoding apparatus comprising:
    means for receiving said encoded video bitstream, for interpreting said encoded video bitstream to perform entropy decoding, generating items of macroblock information to be used for reconstructing said frames of video data, and for storing said items of macroblock information in a memory in the same order in which they are received in said encoded video bitstream;
    means for generating line control information associated with each row of macroblocks, said line control information configured such that sequentially reading said line control information provides access to said items of macroblock information in raster scan order, said means for generating line control information for storing said line control information in association with said items of macroblock information;
    wherein said means for interpreting is configured to resolve predictive encoding between macroblocks of said encoded video stream while reading said macroblocks in sequential order; and
    means for reconstructing said frames of video data with reference to said line control information.

* * * * *